(12) United States Patent
Young, Jr. et al.

(10) Patent No.: US 9,047,350 B2
(45) Date of Patent: Jun. 2, 2015

(54) SYSTEM AND METHOD FOR MANAGING RELATIONSHIPS AMONG RESOURCES

(75) Inventors: James R. Young, Jr., Marysville, WA (US); Elisabeth Robson, Bainbridge Island, WA (US); Vas Sudanagunta, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 1163 days.

(21) Appl. No.: 12/542,737

(22) Filed: Aug. 18, 2009

(65) Prior Publication Data

US 2011/0047273 A1 Feb. 24, 2011

(51) Int. Cl.
| G06F 15/173 | (2006.01) |
| G06F 15/16 | (2006.01) |
| G06F 17/30 | (2006.01) |

(52) U.S. Cl.
CPC .... *G06F 17/30557* (2013.01); *G06F 17/30855* (2013.01)

(58) Field of Classification Search
USPC .......................................................... 709/226
See application file for complete search history.

(56) References Cited

U.S. PATENT DOCUMENTS

| 6,487,583 | B1 * | 11/2002 | Harvey et al. ................. 709/204 |
| 6,804,333 | B1 * | 10/2004 | Liu et al. ..................... 379/88.17 |
| 7,669,123 | B2 * | 2/2010 | Zuckerberg et al. .......... 715/273 |
| 8,010,602 | B2 * | 8/2011 | Shen et al. .................... 709/204 |
| 8,117,281 | B2 * | 2/2012 | Robinson et al. ............. 709/218 |
| 8,468,168 | B2 * | 6/2013 | Brezina et al. ................ 707/783 |
| 8,549,412 | B2 * | 10/2013 | Brezina et al. ................ 715/751 |
| 2002/0006803 | A1 * | 1/2002 | Mendiola et al. ............. 455/466 |
| 2002/0184318 | A1 * | 12/2002 | Pineau ......................... 709/206 |
| 2004/0230492 | A1 * | 11/2004 | Park ............................... 705/26 |
| 2005/0182745 | A1 * | 8/2005 | Dhillon et al. .................... 707/1 |
| 2008/0059608 | A1 * | 3/2008 | Wood et al. .................. 709/219 |
| 2008/0134040 | A1 * | 6/2008 | Pennington et al. .......... 715/733 |
| 2008/0183814 | A1 * | 7/2008 | Sanghavi ...................... 709/204 |
| 2008/0195741 | A1 * | 8/2008 | Wynn et al. .................. 709/229 |
| 2009/0055476 | A1 * | 2/2009 | Markus et al. ................ 709/204 |
| 2009/0178117 | A1 * | 7/2009 | Benschop et al. ................ 726/3 |
| 2009/0292595 | A1 * | 11/2009 | Tonnison et al. ................ 705/11 |
| 2010/0057858 | A1 * | 3/2010 | Shen et al. .................... 709/206 |
| 2010/0057859 | A1 * | 3/2010 | Shen et al. .................... 709/206 |
| 2010/0138481 | A1 * | 6/2010 | Behrens ........................ 709/203 |
| 2010/0174800 | A1 * | 7/2010 | Harik et al. ................... 709/206 |
| 2010/0271457 | A1 * | 10/2010 | Thapa ........................ 348/14.08 |
| 2010/0274617 | A1 * | 10/2010 | Suomela et al. .................. 705/9 |
| 2010/0274859 | A1 * | 10/2010 | Bucuk ........................... 709/206 |
| 2010/0275215 | A1 * | 10/2010 | Suomela et al. .............. 718/106 |
| 2010/0317322 | A1 * | 12/2010 | Underwood et al. ......... 455/410 |
| 2011/0195790 | A1 * | 8/2011 | Konkle ........................... 463/42 |

* cited by examiner

*Primary Examiner* — Karen Tang
(74) *Attorney, Agent, or Firm* — Patterson + Sheridan, LLP

(57) ABSTRACT

A method for managing relationships among resources includes providing a first resource having a first resource identifier, providing a second resource having a second resource identifier, and upon user initiation creating a managed relationship between the first resource identifier and the second resource identifier.

12 Claims, 9 Drawing Sheets

SYSTEM AND METHOD FOR MANAGING RELATIONSHIPS AMONG RESOURCES

BACKGROUND

There are many applications in which there are relationships between one or more resources. In some applications, the resources may be similar and in other applications the resources may be disparate. Examples of resources include, but are not limited to, user accounts, user groups, documents, photographs, or any other data item and possible associated dependent objects. In many applications in would be desirable to create and manage relationships between and among these resources. A simplified example of a relationship that may exist between two resources is a social networking application in which a relationship between two users is managed by the social networking application. Each resource is typically identified to the social networking application. However, these users are typically managed by the same underlying system or service.

One of the challenges in managing disparate resources stems from the fact that different resources may be created and managed by different underlying systems. For example, a user account for an email address is managed by an email system, while a photograph is managed by a photo management system. Therefore, managing a relationship between these two disparate resources requires that the management system have the ability to associate with and manage two different underlying systems.

In addition, there are problems associated with managing similar resources that may be created and managed by the same underlying system. In such an application, it would be desirable to be able to manage any resource, managed by any underlying system.

SUMMARY

Embodiments of the invention include a method for managing relationships among resources including providing a first resource having a first resource identifier, providing a second resource having a second resource identifier, and upon user initiation creating a managed relationship between the first resource identifier and the second resource identifier.

Other embodiments are also provided. Other systems, methods, features, and advantages will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
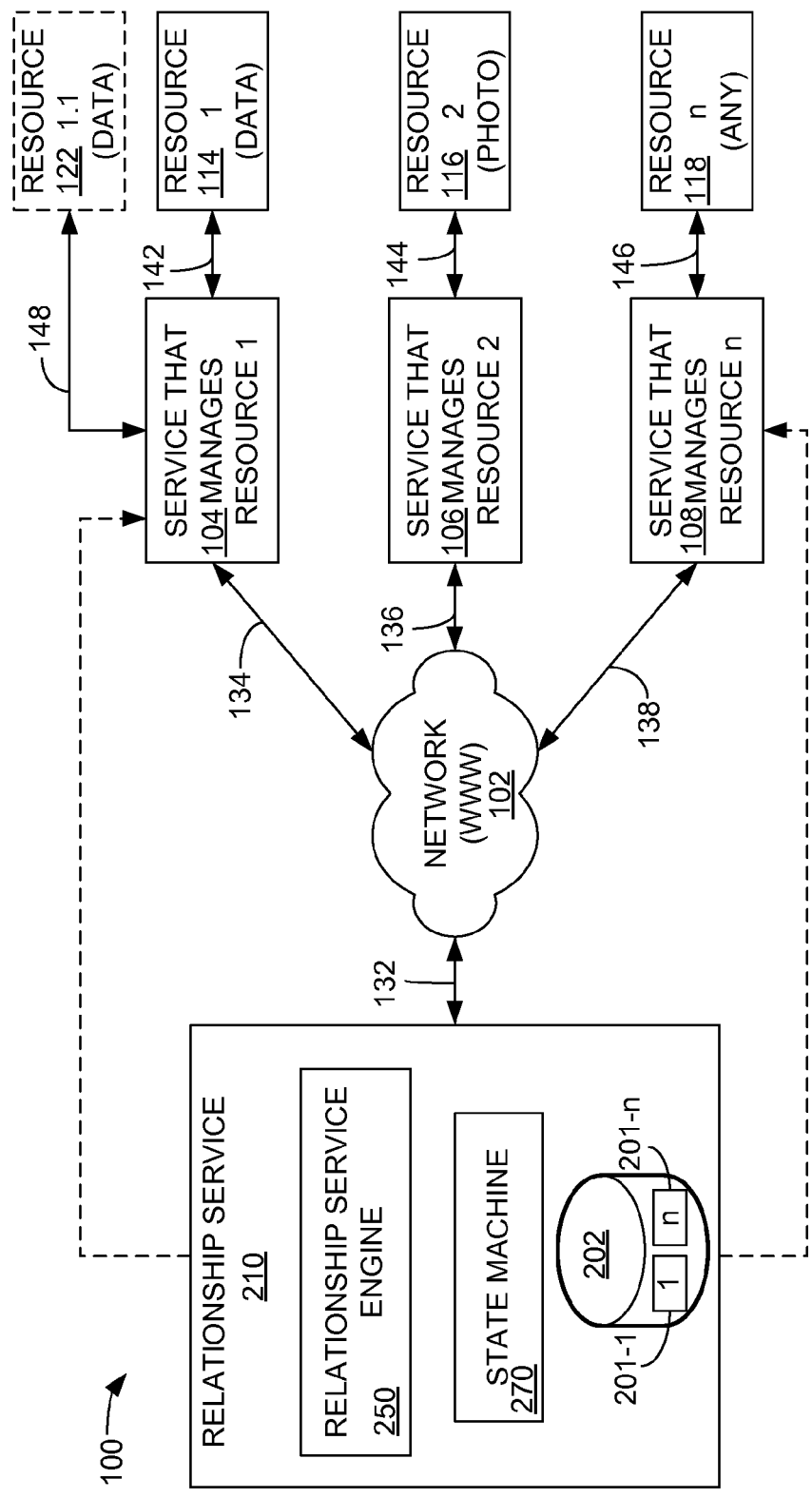
FIG. 1 is a block diagram illustrating an example of an implementation of a system for managing a relationship between at least two resources.

The system and method for managing relationships among resources will be described primarily in the context of managing resources that may be managed by the same underlying system or by different underlying systems, referred to herein as "services." However, the system and method for managing relationships among resources is applicable to managing resources associated with any underlying service.

The system and method for managing relationships among resources can be implemented in hardware, software, or a combination of hardware and software. When implemented in hardware, the system and method for managing relationships among resources can be implemented using specialized hardware elements and logic. When the system and method for managing relationships among resources is implemented in software, the software can be used to control the various components in a system and network associated with the program. The software can be stored in a memory and executed by a suitable instruction execution system (microprocessor). The hardware implementation of the system and method for managing relationships among resources can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for managing relationships among resources comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

In the description to follow, the term "resource" refers to any user data, content, object, etc., that can be identified by a globally unique identifier. Non-limiting examples of resources include, for example, user data associated with a system such as an email system or any system that manages user data, a data object, such as a photograph or any other data or media, or any resource that can be managed by a service.

The term "globally unique identifier" refers to any identifier that can uniquely identify a resource. An example of a globally unique identifier can be a universal resource identifier (URI), an email address, a universal resource location (URL) on the world wide web (WWW), or any other identifier that can uniquely refer to or otherwise identify a resource.

The term "service" or "management service" as used herein describes any service that can manage a resource. A non-limiting example of a service is an email system that manages email user data, a photo sharing website that manages photographs, or any other service that manages a uniquely identifiable resource.

The term "managed relationship" refers to a relationship between or among two or more resources that can be managed by a service.

FIG. 1 is a block diagram illustrating an example of an embodiment of a system for managing relationships among resources. The embodiment in FIG. 1 shows a relationship management system 100 that includes a relationship service 210 coupled via a network 102 to a plurality of services that manage resources. The network 102 can be any wide-area or local area network, and is illustratively depicted as the world wide web. The relationship service 210 is connected to the network 102 over connection 132. The connection 132 can be any bidirectional wired or wireless connection that can couple the relationship service 210 to the network 102.

The services that can be connected to the network 102 include, for example, but not limited to, a service 104 that manages a first resource 114, a service 106 that manages a second resource 116, and a service 108 that manages any other resource 118. The services 104, 106 and 108, are connected to the network 102 over respective connections 134, 136 and 138. The connections 134, 136 and 138 can be any bidirectional wired or wireless connections that connect a service to a network.

In the example illustrated in FIG. 1, each service has at least one resource associated with it. As an example, a first resource 114 is coupled to the service 104 over connection 142. In this example, the first resource 114 can be an email user data associated with the service 104, and the service 104 can be an e-mail service that manages the first resource 114. In a typical implementation, the service 104 includes additional resource 122, which is connected to the service 104 over connection 148 and which, in this example, can be additional e-mail user data. However, many additional resources can be associated with the service 104.

A second resource 116 is associated with the service 106. In this example, the second resource 116 can be a photograph. However, the second resource 116 can be any data, media, file, etc., or can be any other data object. The second resource 116 is coupled to the service 106 over connection 144. In this example, in which the second resource is a photograph, the service 106 can be a photo service website, or any other service that can manage the second resource 116.

The additional resource 118 illustrates that any number of resources can be associated with any number of services that manage such resources. In this example, the service 108 is connected to the additional resource 118 over connection 146. The service 108 can be any service that can manage the additional resource 118. Further, any number of resources can be associated with each service.

The relationship service 210 can be any hardware, software, or combination of hardware and software that can manage relationships between and among the above-described resources, whether between or among resources connected to the same service, or between or among resources connected to different services. In an example, the relationship service 210 is a software element that can reside on, for example, a server computer, and that can be coupled to the network 102. Alternatively, the relationship service can be implemented as part of a website, a web service, or any other entity that is accessible over the network 102.

In this example, the relationship service 210 includes a relationship service engine 250, a state machine 270, which may include additional state machines, and a database 202. The relationship service engine 250 can be software, hardware, or a combination of software and hardware that can execute the logic in the state machine 270. As will be described in greater detail below, the state machine 270 can comprise any number of steps and logical functions that control the operation of the relationship service 210. In addition, there may be one or more additional state machines that can manage, for example, the relationship lifecycles between many different resources.

The database 202 contains one or more resource identifiers 201-1 through 201-n, each also referred to as a resource ID. The resource identifiers 201-1 through 201-n are related to the resources 114, 116 and 118, in that the resource identifiers 201-1 through 201-n uniquely identify a resource, as described above. The resource identifiers 201-1 through 201-n can be, for example, an email address that corresponds to email user data in the case where the resource is email user data, a photograph name that corresponds to a photograph in the case where the resource is a photograph, or any other resource identifier that can uniquely identify a particular resource. The database 202 in the relationship service 210 stores only resource identifiers 201, while the resources 114, 116, 118, 122, etc., remain associated with their respective services, As a result, the database 202 remains comparatively small and easily accessible by the relationship service engine 250.

In accordance with an embodiment of the system and method for managing relationships among resources, each service 104, 106, and 108 makes available to the relationship service 210 a resource identifier 201 corresponding to a particular managed resource associated with each service. For example, the service 104 makes available to the relationship service 210 a resource identifier that corresponds to the resource 114. In operation, the relationship service 210 accesses from its database 202 a resource identifier associated with each service that represents each resource. For example, the relationship service 210 stores in the database 202 an identifier 201 which refers to, also referred to as "points to," service 104 and the resource 114 that is managed by the service 104.

Each resource has a globally unique identifier, such as a uniform resource locator (URL), a universal resource indicator (URI), an account ID, a user ID, a guest ID, or any other unique identifier.

The ability to uniquely identify each resource allows the relationship service 210 to manage relationships between and among any of the resources coupled to any of the services. In an embodiment, the relationship service 210 can create and manage one or more relationships between or among two or more resources associated with the same service. Alternatively, the relationship service 210 can create and manage one or more relationships between or among two or more resources associated with different services.

Figure 2:
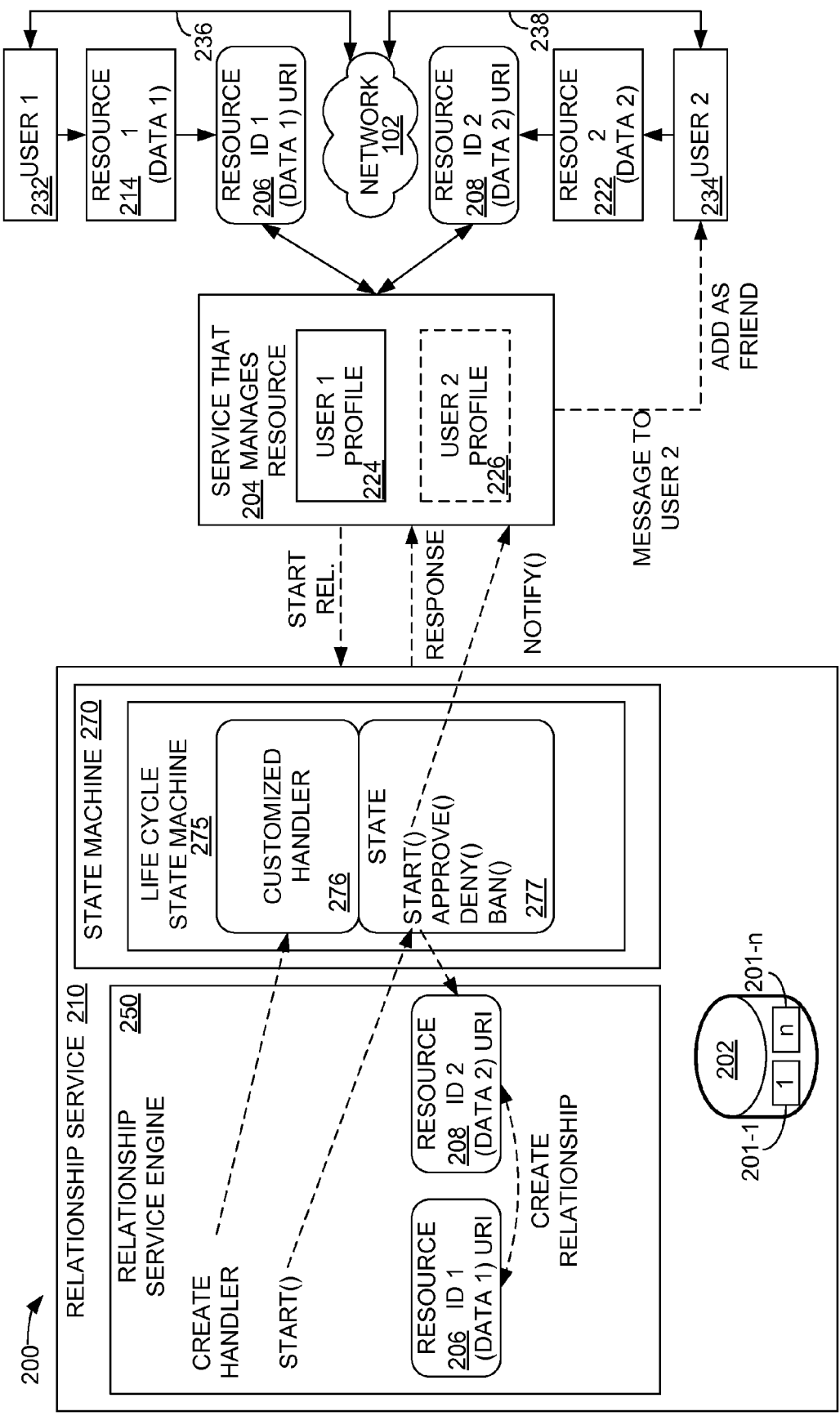
FIG. 2 is a functional block diagram illustrating the operation of an embodiment of the relationship service of FIG. 1.

FIG. 2 is a functional block diagram illustrating the operation of an embodiment of the relationship service of FIG. 1. FIG. 2 illustrates an embodiment 200 of the relationship service 210 in which a relationship is created and managed between two resources managed by the same service. The description of the embodiments illustrated in FIG. 2 through FIG. 5 assumes a case in which a first user of an email system is registered with a service and a second user is not registered with the service. However, the description to follow also contemplates the case where both users are registered, or can be registered or otherwise affiliated, with the same service. As used herein, the term "user" refers to an individual user of an email system and the term "user data" refers to data (i.e., a resource) that is associated with a user of the system. Further, although not specifically described, the description below is also applicable in a case where a relationship is created and managed between two or more resources that are associated with different services.

The relationship service 210 includes the relationship service engine 250 and the state machine 270. In this embodiment, the state machine 270 comprises what is referred to as a "life cycle" state machine 275. The term "life cycle" refers to a state machine that creates and manages one or more relationships between resources over the "life of the relationship" and will be described below.

The life cycle state machine 275 includes a customized handler 276 and a state list 277. The customized handler 276 comprises program logic that performs functions for the relationship. For example, in the case of managing a relationship between two resources that include email data, the customized handler 276 might send an email notification when a relationship starts. Alternatively, in the case of managing a relationship between two or more resources that include user-generated content (i.e. photos, video clips, audio clips, etc.); hotel reservations; travel schedule records; financial transactions, etc., the customized handler 276 might make a record in an auditing system. The customized handler 276 allows an entity, such as a business unit, a development group, a business client, etc., to insert particular business logic into a version of the lifecycle state machine 275 that can be customized by the particular logic in the customized handler 276.

In the example shown in FIG. 2, a service 204 manages a first resource 214 and a second resource 222. In FIG. 2, the first resource 214 and the second resource 222 are illustrated as being associated with a first resource identifier 206 and a second resource identifier 208, respectively. The resource identifiers 206 and 208 are similar to the resource identifiers 201 described above. The first resource identifier 206 is associated with the first resource 214 and the second resource identifier 208 is associated with the second resource 222. However, while the first resource 214 remains associated with the service 204, the first resource identifier 206 resides in the relationship service 210. Similarly, while the second resource 222 remains associated with the service 204, the second resource identifier 208 resides in the relationship service 210.

The first resource identifier 206 is the resource identifier associated with first resource 214 that is associated with the service 204 and the second resource identifier 208 is the resource identifier associated with the second resource 222 that is associated with the service 204. As an example, the first resource 214 can be user data associated with a first user 232 of the service 204, and the second resource 222 can be user data that is associated with a second user 234 of the service 204, and in which the service 204 is an email service.

In an embodiment, the service 204 also includes a user 1 profile 224 that corresponds to the first user 232, and, if the second user 234 is registered with the service 204, includes a user 2 profile 226 that corresponds to the second user 234. The user 2 profile 226 is shown as a dotted line to indicate that it may or may not be initially included in the service 204, depending on whether the second user 234 is registered with the service 204 prior to the creation of a relationship. The user 1 profile 224 includes information relating to the first user 232 and the user 2 profile 226 includes information relating to the second user 234. In an embodiment, the information contained in the user 1 profile 224 can be a subset of the information in the first resource 214. For example, the user 1 profile 224 may include, for example, biographical information such as name, address, etc., and may include other information, such as, likes, dislikes, school attended, favorite things, etc. Similarly, the user 2 profile 226 may include information related to the second resource 222.

In an example scenario, the first user 232 may attempt to create a relationship with the second user 234. To effect the creation of the relationship, the relationship service engine 250 attempts to create a relationship between the first resource identifier 206 and the second resource identifier 208. As a non-limiting example of one manner of initiating the creation of a relationship between the first user 232 and the second user 234, the first user 232 may access the network 102 via connection 236, by viewing for example, a web page, performing a search, reviewing a list of users, then selecting a user, such as the second user 234 to initiate the relationship.

Alternatively, an automated process could initiate a relationship as part of background processing. However, in most instances, an individual will decide that a resource should have a relationship with another resource and initiate the process. Other non-limiting examples of relationship initiation include a first user wishing to initiate a relationship with a group, a first user wishing to initiate a relationship with a photograph by adding a photograph to the group, or photograph page associated with the group, adding additional users to a group, or any other relationship.

In an illustrative embodiment, the relationship service engine 250 invokes the customized handler 276. The relationship service engine 250 attempts to access the user 1 profile 224 and/or the resource 214 associated with the first user 232 and the user 2 profile 226 and/or the resource 222 associated with the second user 234 from the service 204. The relationship service engine 250 then invokes the start state in an attempt to create a relationship between the first resource identifier 206 and the second resource identifier 208.

Depending upon whether the first resource identifier 206 and the second resource identifier 208 are available in the database 202, either the resource identifier that corresponds to the first resource or a resource identifier that corresponds to an invitation that can be viewed by a user will be created within the relationship service engine 250. In this example, it is assumed that the first user 232 is associated with the service 204 and that the second user 234 is not associated with the service 204 and, as will be described below, a resource identifier type corresponding to an invitation is created and sent to the second user 234. To create the relationship, the relationship service engine 250 uses the globally unique resource identifier, such as the URI, or, in this email example, the email address associated with each resource, to associate the resources together and form the relationship between the resources.

In the example shown in FIG. 2, after the creation of the relationship is initiated, a notify command will be issued to the service 204. The service 204 will then send a message to the second user 234 alerting the second user 234 that an invitation has been created for the second user 234 to view and consider. The message sent by the service 204 to the second user can be an email message, a text message, or any other type of message. Because the second user 234 is not registered with the service 204 in the example described, the message may contain in addition to a request to view the invitation, instructions on registering with the service 204, and instructions on how to approve or deny the request. In alternative embodiments in which the second user 234 is already registered with the service 204, the message may contain only the request to view the invitation or a "relationship approval request."

Figure 3:
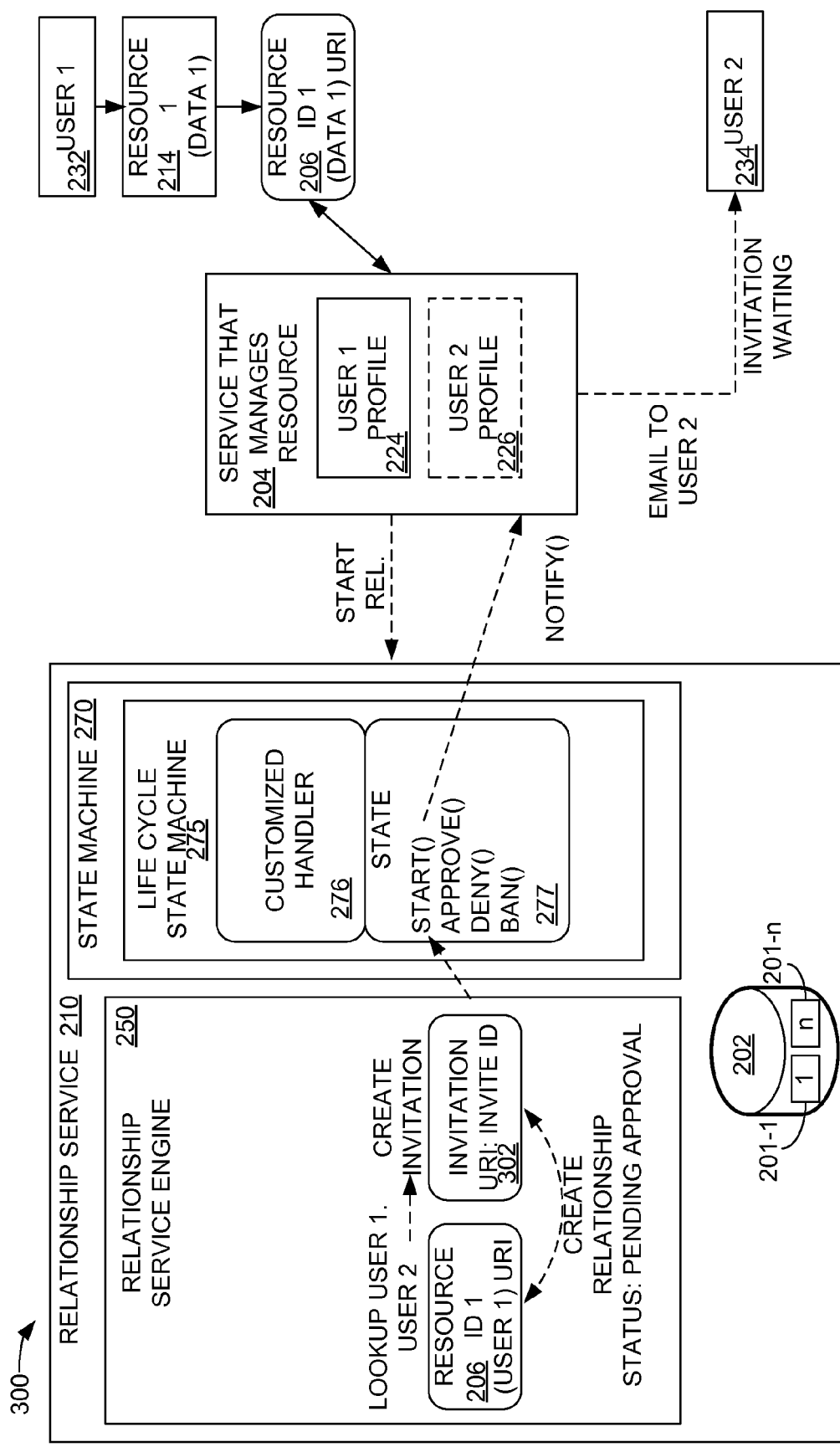
FIG. 3 illustrates an embodiment of the relationship service of FIG. 2 in which an invitation is created.

FIG. 3 illustrates an embodiment 300 of the relationship service 210 of FIG. 2 in which an invitation is created. In this example, the first user 232 initiates the creation of the relationship with the second user 234 by causing the service 204 to send the second user's email address to the relationship service 210 in a "start relationship" request. In FIG. 3, an invitation resource identifier 302 has been created and is shown as residing within the relationship service engine 250. The relationship between the first resource identifier 206 and the invitation resource identifier 302 has been created and the status of the relationship is pending. The service 204 notifies the second user 234 that an invitation is waiting. In the embodiment shown in FIG. 3, the status of the relationship service engine is shown as pending approval.

Figure 4:
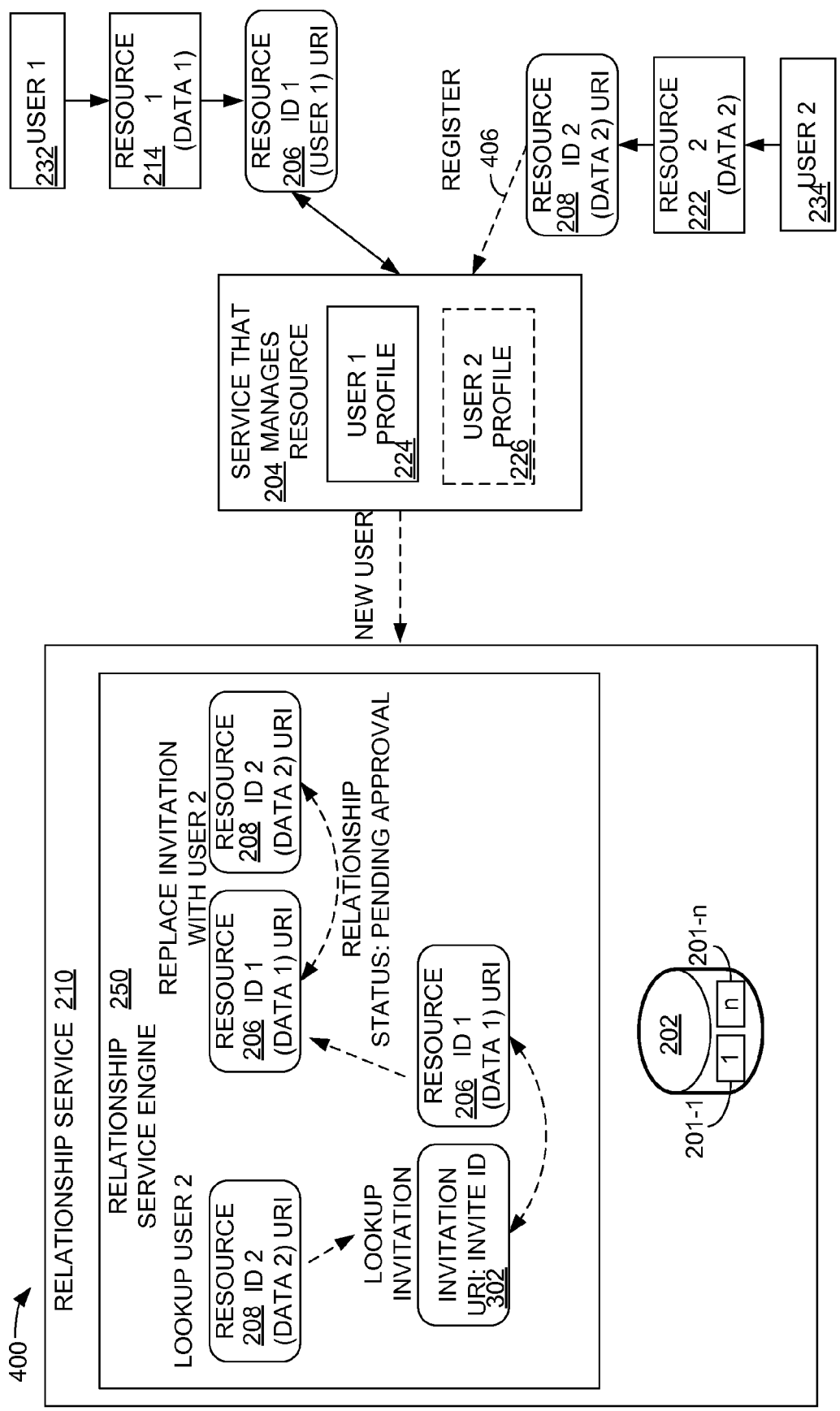
FIG. 4 illustrates an embodiment of the relationship service of FIG. 2 in which a second user is added to the relationship service.

FIG. 4 illustrates an embodiment 400 of the relationship service 210 of FIG. 2 in which the second user 234 is added to the relationship service 210. In FIG. 4, the relationship service engine 250 attempts to determine whether the second resource identifier 208 is located in the database 202 (FIG. 1).

Because the second user 234 has received an e-mail invitation from the relationship service 210 via the service 204, the second user 234 will attempt to register with the service 204. This is illustrated with the dotted line 406 connecting the second resource identifier 208 to the service 204. The service 204 informs the relationship service 210 that a new user (user 2) 234 has registered.

Once the new user has registered, a resource identifier 208 that represents the second user 234 is created in the relationship service engine 250. The relationship service engine 250 then substitutes the second resource identifier 208 for the invitation resource identifier 302, which represents the invitation to the second user 234. In this manner, the first resource identifier 206 representing the first user 232 is associated with the second resource identifier 208 representing the second user 234 in the relationship service engine 250. At this point the relationship between the first resource identifier 206 and the second resource identifier 208 is still pending the approval of the second user 234.

Figure 5:
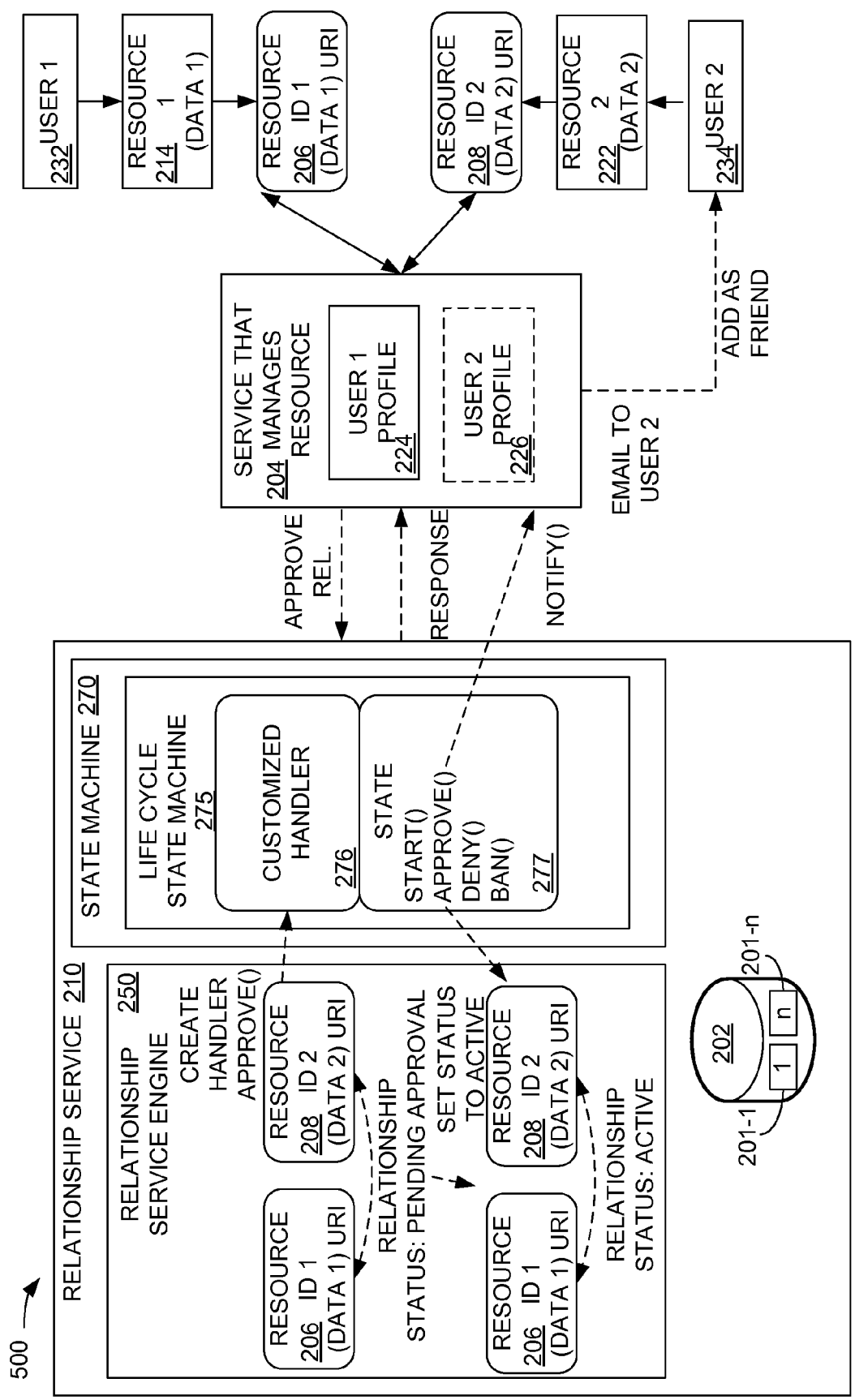
FIG. 5 illustrates an embodiment of the relationship service of FIG. 2 in which a second user approves the relationship.

FIG. 5 illustrates an embodiment 500 of the relationship service 210 of FIG. 2 in which a second user 234 approves the relationship. In FIG. 5, the second user 234 represented by the second resource identifier 208 has approved the relationship. The customized handler 276 notifies the service 204 that the second user 234 has approved the relationship with the first user 232 and the relationship between the first resource identifier 206 and the second resource identifier 208 is now considered active.

In an embodiment, the relationship service engine 250 manages relationships between the resource identifiers, functioning as a facilitator or moderator between different resources. In an embodiment, the relationship service engine 250 functions without actual knowledge of the resources. In an embodiment, the customized handler 276 can be programmed with information relating to the type or types of resources that correspond to the resource identifiers. In this manner, the customized handler 276 can include logic relating to the resources and can provide guidance as to whether a relationship between two or more resources should be established.

Figure 6:
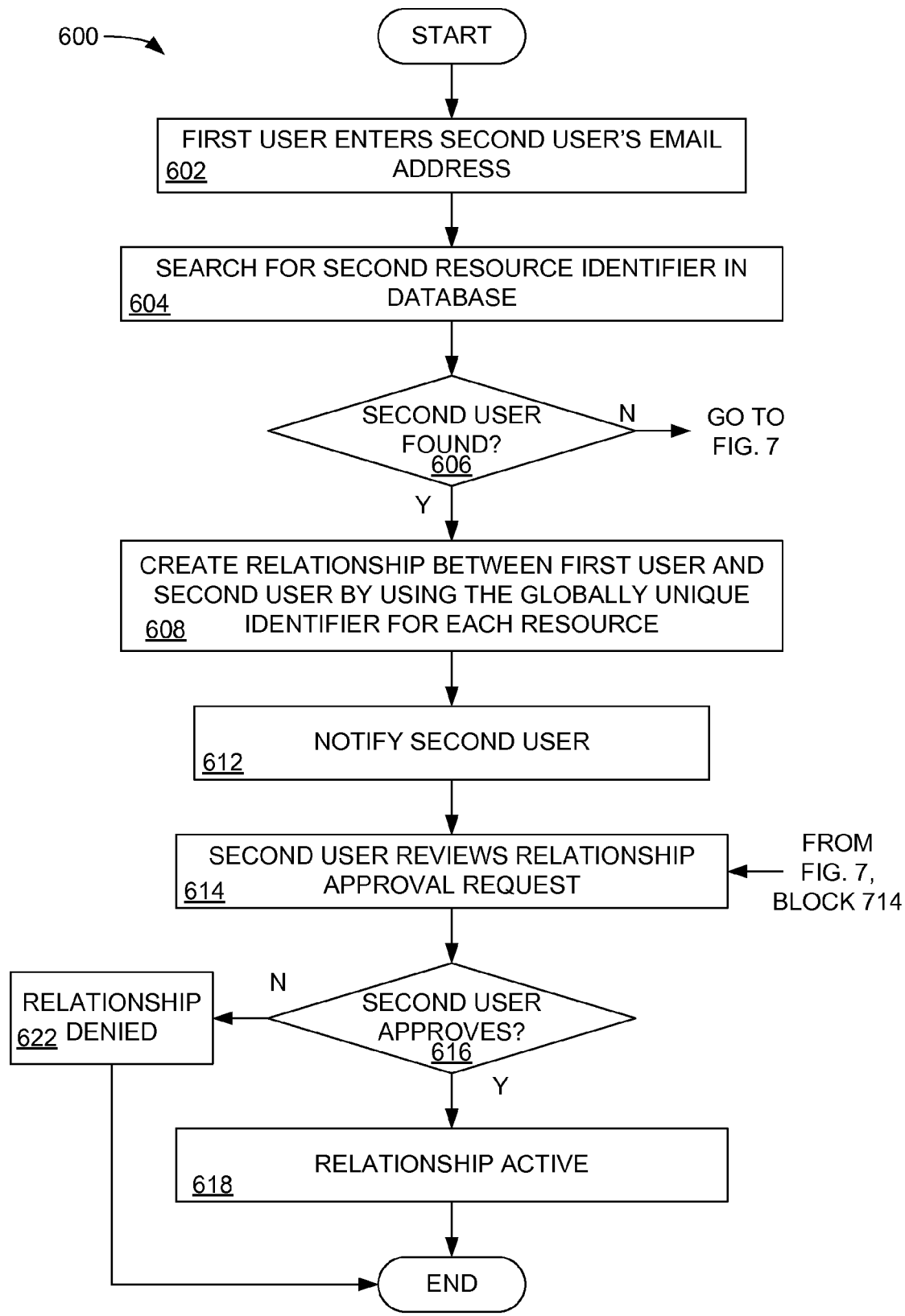
FIG. 6 illustrates a flow diagram for an embodiment of the system and method for managing relationships among resources.

FIG. 6 illustrates a flow diagram for an embodiment of the system and method for managing relationships among resources. The embodiment described in FIG. 6 is an example of a user associated with an email service attempting to create a relationship with another user of the same email service. Alternatively, a user of an email service can attempt to create a relationship with a user of a different email service, or with a different resource entirely, managed by a different service.

In block 602 the first user 232 enters the second user's e-mail address by causing the service 204 to send the second user's email address to the relationship service 210 in the "start relationship" request.

In block 604 the relationship service 210 attempts to locate the second resource identifier 208 associated with the second user 234 in the database 202 (FIG. 1, FIG. 2). In block 606, it is determined whether the relationship service 210 can locate the second resource identifier 208 in the database 202. If the relationship service 210 cannot locate the second resource identifier 208 corresponding to the second user 234 in the database 202, then the process proceeds to FIG. 7, which will be described below. If however, in block 606 the relationship service 210 does locate the second resource identifier 208, then, in block 608, the relationship service 210 uses the globally unique resource identifier 208, such as the email address of the first user 232 and the email address of the second user 234, to associate the first resource identifier 206 and the second resource identifier 208 together and creates a relationship between the first resource identifier 206 corresponding to the first user 232 and the second resource identifier 208 corresponding to the second user 234. The relationship remains in the pending state.

In block 612, the relationship service 210 causes the service 204 to notify the second user 234 that there is an invitation to view. Because in this example, the second user 234 is already registered with the service 204, and a second resource identifier 208 is present in the database 202, the relationship service 204 causes the service 204 to send what is referred to as a "relationship approval request" to the second user 234.

In block 614, the second user 234 reviews the relationship approval request. In block 616 it is determined whether the second user 234 approves the relationship identified in the relationship approval request. If the second user 234 does not approve the relationship, then, in block 622, the relationship is considered "denied," the relationship is terminated, and the process ends. If however, in block 616, the second user 234 approves the relationship, then, in block 618, the relationship is placed in the active state and is managed by the relationship service 210.

Figure 7:
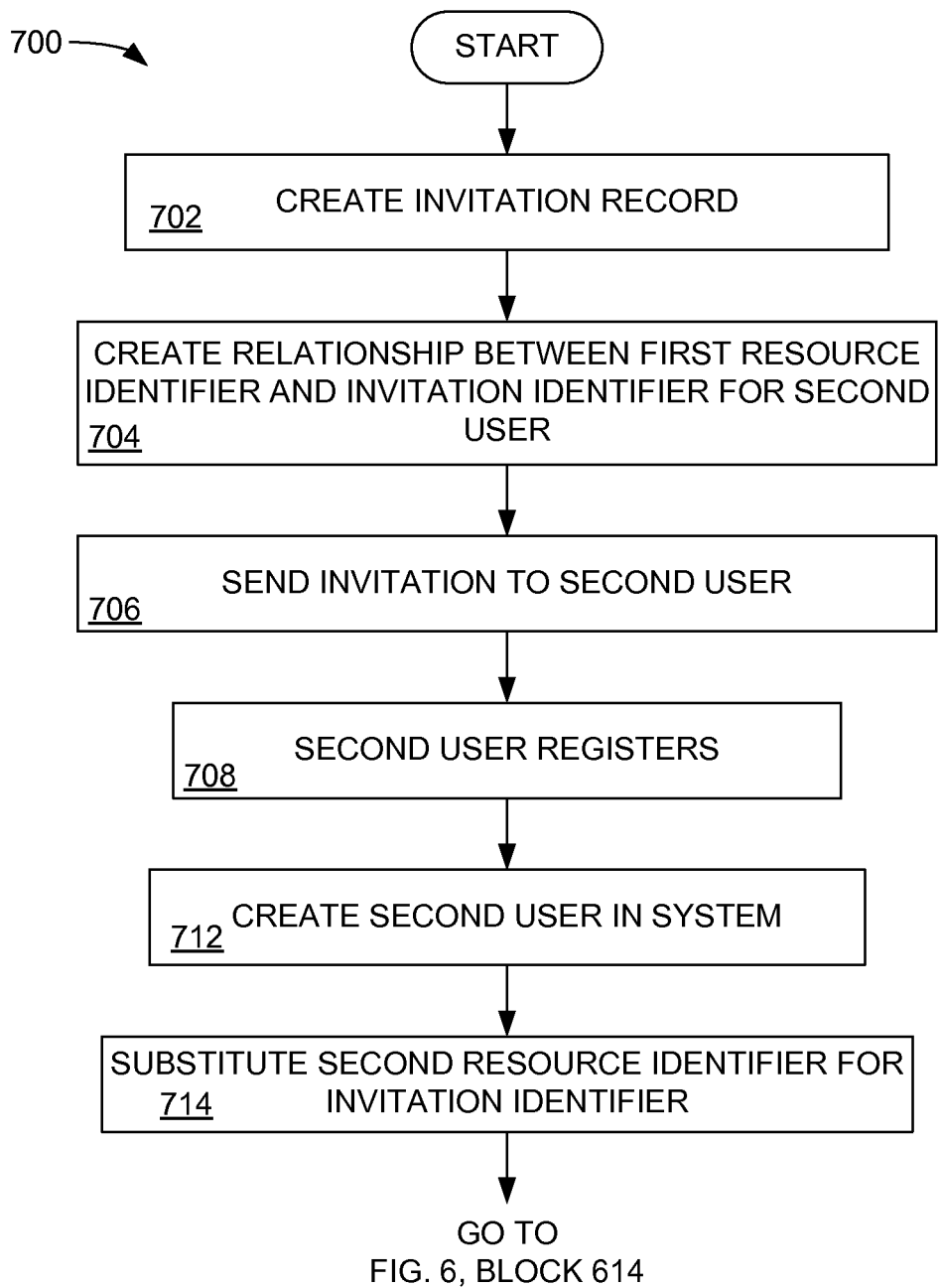
FIG. 7 illustrates a flow diagram for an embodiment of the system and method for managing relationships among resources in which a user is created in the relationship service.

FIG. 7 illustrates a flow diagram for an embodiment of the system and method for managing relationships among resources in which a user does not initially exist in the service 204, but is instead created in the relationship service 210 as a result of a request to create a relationship. In block 702, and assuming that the second user 234 was not located in block 606, the relationship service engine 250 creates an invitation resource identifier 302. In block 704, the relationship service engine 250 creates a relationship between the first resource identifier 206 corresponding to the first user 232 and the invitation resource identifier 302, which can be thought of as a place holder for the second user 234 within the relationship service 210. The relationship is set to the pending state.

In block 706, the relationship service engine 250 causes the service 204 to send an invitation message to the second user 234. The invitation message can be a text message, an email message, or any other message. As described above, the message may contain in addition to a request to view the invitation, instructions on registering with the service 204, and instructions on how to approve or deny the request.

In block 708, the second user 234 registers with the service 204 that manages the resources 214 and 222. In block 712, the relationship service engine 250 creates a second resource identifier 208 corresponding to the second user 234. In block 714, the second resource identifier 208 associated with the second user 234 is substituted for the invitation resource identifier 302. The flow proceeds to block 614 of FIG. 6 where the second user 234 views the relationship approval request. The process of FIG. 7 ends and the process of FIG. 6 is completed, as described above.

Figure 8:
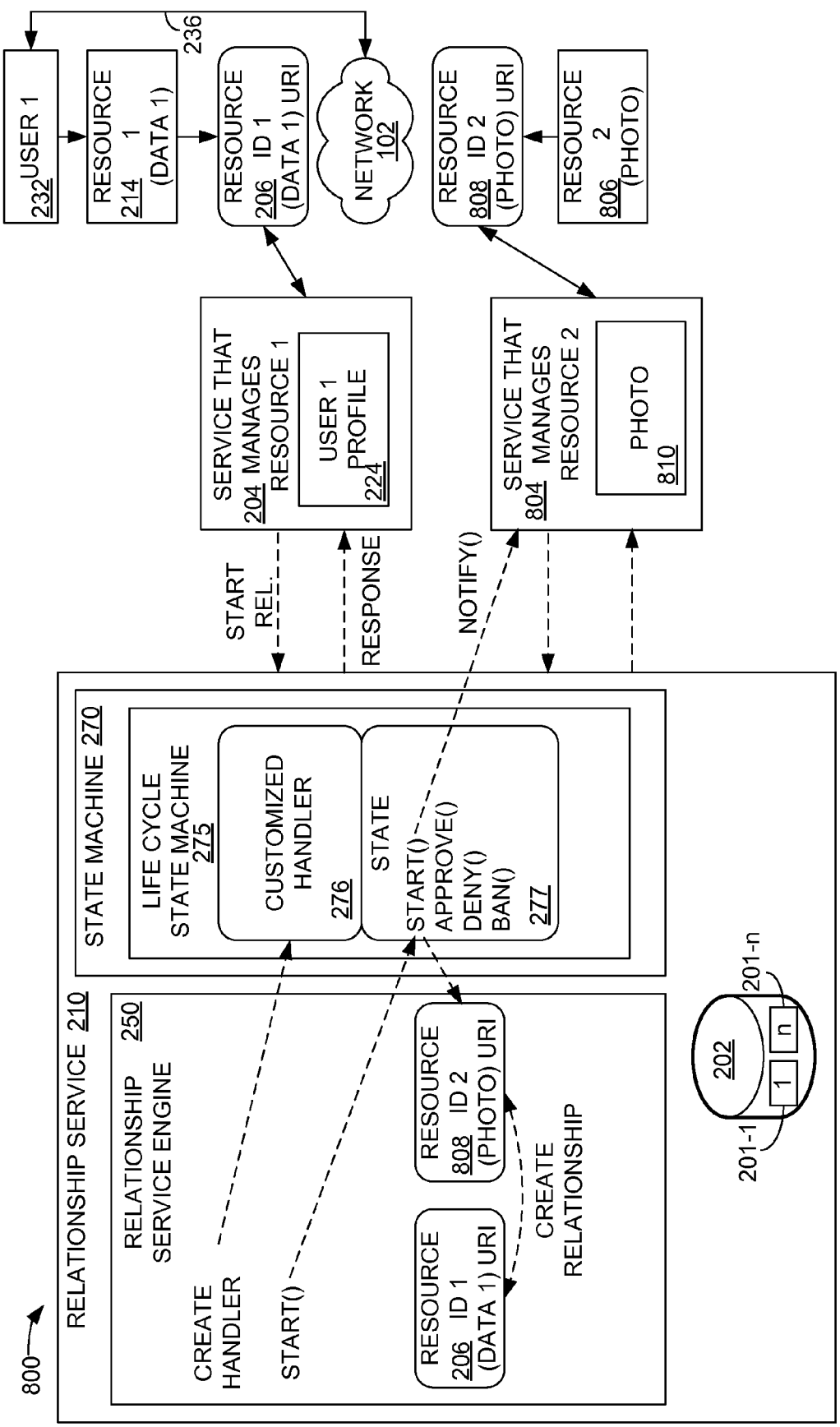
FIG. 8 is a functional block diagram illustrating the operation of an alternative embodiment of the relationship service of FIG. 2.

FIG. 8 is a functional block diagram illustrating the operation of an alternative embodiment of the relationship service of FIG. 2. FIG. 8 illustrates an embodiment 800 of the relationship service 210 in which a relationship is created and managed between two resources that are managed by different services. The embodiment of FIG. 8 includes many elements that have been described above, and the description of these elements will not be repeated except to facilitate understanding of the embodiment 800.

The description of FIG. 8 assumes a case in which a first user 232 of an email system is registered with the service 204 and an additional resource 806, which in this example is a photograph resource, is registered with an additional service 804. In this embodiment, the additional service 804 can be, for example, a photograph sharing service. However, the description to follow also contemplates the case where the first user 232 may be registered with the service 204 and in which the second resource 806 may not be registered with the service 804.

The life cycle state machine 275 includes a customized handler 276 and a state list 277. The customized handler 276 comprises program logic that performs functions for the relationship. For example, in the case of managing a relationship between one resource that includes email data and another resource that includes photographic data, the customized handler 276 might send an email notification to the owner of the photograph when a relationship starts.

In the example shown in FIG. 8, a service 204 manages the first resource 214 and the service 804 manages the second resource 806. In FIG. 8, the first resource 214 is illustrated as being associated with the first resource identifier 206 and the second resource 806 is illustrated as being associated with a second resource identifier 808. In this example, the second resource identifier 808 is a globally unique identifier that identifies the photograph of the second resource 806.

However, while the first resource 214 remains associated with the service 204, the first resource identifier 206 resides in the relationship service 210. Similarly, while the second resource 806 remains associated with the service 804, the second resource identifier 808 resides in the relationship service 210.

The first resource identifier 206 is the resource identifier associated with the first resource 214 that is associated with the service 204 and the second resource identifier 808 is the resource identifier associated with the second resource 806 that is associated with the service 804. As an example, the first resource 214 can be user data associated with a first user 232 of the service 204, and the second resource 806 can be photograph data that is associated with the service 804, and in which the service 804 is a photograph service, such as a photograph sharing service. The service 204 also includes a user 1 profile 224 that corresponds to the first user 232. The service 804 includes a photograph 810, which can be an instance of the resource 806, or which can include more or fewer data than the resource 806.

In an example scenario, the first user 232 may attempt to create a relationship with the photograph associated with the second resource 806. To effect the creation of the relationship, the relationship service engine 250 responds to an attempt by the first user 232 to create a relationship with the resource 806. In this example, the relationship service engine 250 attempts to create a relationship between the first resource identifier 206 and the second resource identifier 808.

In an illustrative embodiment, the relationship service engine 250 invokes the customized handler 276. The relationship service engine 250 attempts to access the user 1 profile 224 from the service 204, and attempts to access the resource 806 from the service 804. The relationship service engine 250 then invokes the start state in an attempt to create a relationship between the first resource identifier 206 and the second resource identifier 808.

In this example, it is assumed that the first resource identifier 206 and the second resource identifier 808 are available in the database 202 (FIG. 1). To create the relationship, the relationship service engine 250 uses the globally unique resource identifier, such as the URI, or, in this example, the email address associated with the first resource 214 and the URI of the second resource 806, to associate the resources 206 and 808 together and form the relationship between the resources 206 and 808.

In the example shown in FIG. 8, after the creation of the relationship is initiated, a notify command will be issued to the service 804. The notify command includes a notification that the first user 232 has added the photograph 810 to their profile 224, to their group, or to another relationship. The service 204 also receives a response including a notification that the first user 232 has added the photograph 810 to their profile 224, to a group, or to another relationship.

Figure 9:
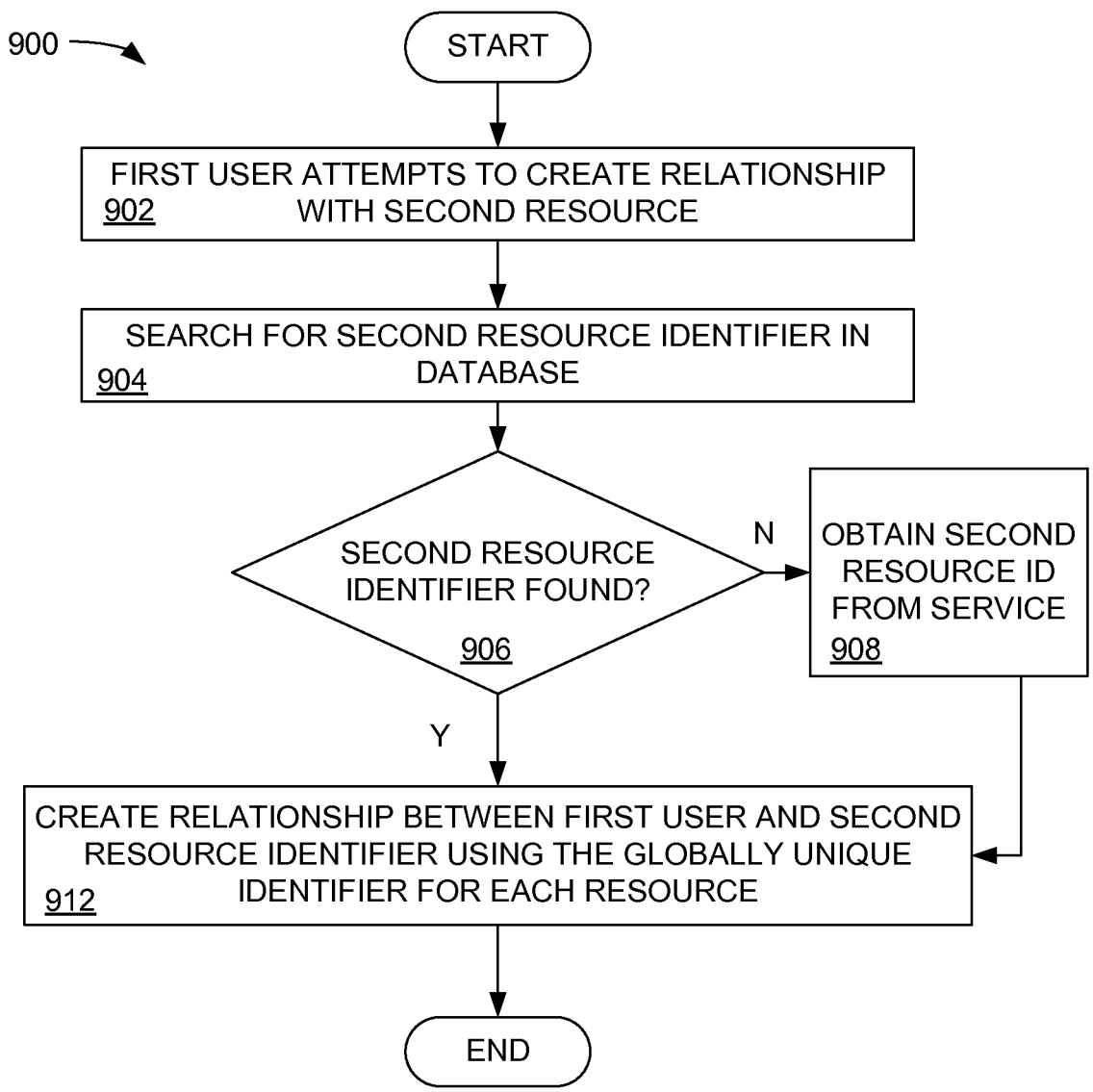
FIG. 9 illustrates a flow diagram for an embodiment of the system and method for managing relationships among resources.

FIG. 9 illustrates a flow diagram for an embodiment of the system and method for managing relationships among resources. The embodiment described in FIG. 9 is an example of a user associated with an email service attempting to create a relationship with a photograph resource that is managed by a service different from the service that manages the first user resource.

In block 902 the first user 232 attempts to create a relationship with the second resource 806. In block 904 the relationship service 210 attempts to locate the second resource identifier 808 in the database 202 (FIG. 1, FIG. 2).

In block 906, it is determined whether the relationship service 210 can locate the second resource identifier 808 in the database 202. If the relationship service 210 cannot locate the second resource identifier 808 in the database 202, then, in block 908, the relationship service 210 obtains the second resource identifier 808 from the service 804.

If however, in block 906 the relationship service 210 does locate the second resource identifier 808 in the database 202, then, in block 912, the relationship service 210 uses the globally unique resource identifier 808, such as the URI of the photograph 810, to associate the first resource identifier 206 and the second resource identifier 808 together and create a relationship between the first resource identifier 206 and the second resource identifier 808.

While various embodiments of the invention have been described, it will be apparent to those of ordinary skill in the art that many more embodiments and implementations are possible that are within the scope of the invention.

What is claimed is:

1. A method of managing relationships among electronically provided resources in a data network, comprising:
   providing an email system managing an email account, the wherein a first profile of the email system specifies an email address identifying the email account;
   providing a photograph service managing a photograph, wherein a uniform resource locator (URL) identifies the photograph; and
   responsive to receiving user input specifying to create a relationship between the email account and the photograph, creating, by a relationship service in communication with the email system and the photograph service via the data network, a managed relationship between the email address and the URL by storing in the relationship service: the email account, the URL, an indication of a direct relationship between the email address and the URL.

2. The method of claim 1, further comprising:
   upon determining that the URL does not exist in the first service:
      creating an invitation resource identifier associated with the photograph;
      updating the relationship to associate the invitation resource identifier with the email account; and
      sending the invitation resource identifier for user acceptance.

3. The method of claim 2, further comprising:
   upon receiving user acceptance of the invitation resource identifier:
      creating the URL; and
      substituting the URL for the invitation resource identifier.

4. The method of claim 3, wherein the email address is of a user having the email account, wherein creating the relationship further comprises associating the photograph with the first profile.

5. A system, comprising:
   one or more computer processors; and
   a memory containing a program, which when executed by the one or more computer processors, performs an operation to manage relationships among electronically provided resources in a data network, the operation comprising:
      providing an email system managing an email account, the wherein a first profile of the email system specifies an email address identifying the email account;
      providing a photograph service managing a photograph, wherein a uniform resource locator (URL) identifies the photograph; and
      responsive to receiving user input specifying to create a relationship between the email account and the photograph, creating, by a relationship service in communication with the email system and the photograph service via the data network, a managed relationship between the email address and the URL by storing in the relationship service: the email account, the URL, an indication of a direct relationship between the email address and the URL, and an indication of an association between the photograph and the first profile.

6. The system of claim 5, the operation further comprising:
   upon determining that the URL does not exist in the first service:
      creating an invitation resource identifier associated with the photograph;
      updating the relationship to associate the invitation resource identifier with the email account; and
      sending the invitation resource identifier for user acceptance.

7. The system of claim 6, the operation further comprising:
   upon receiving user acceptance of the invitation resource:
      creating the URL; and
      substituting the URL for the invitation resource identifier.

8. The system of claim 7, wherein email address is of a user having the email account, wherein creating the relationship further comprises associating the photograph with the first profile.

9. A computer program product to manage relationships among electronically provided resources in a data network, the computer program product comprising a non-transitory computer-readable storage medium including computer-readable program code configured to;
   provide an email system managing an email account, the wherein a first profile of the email system specifies an email address identifying the email account;
   provide a photograph service managing a photograph, wherein a uniform resource locator (URL) identifies the photograph; and
   responsive to receiving user input specifying to create a relationship between the email account and the photograph, create, by a relationship service in communication with the email system and the photograph service via the data network, a managed relationship between the email address and the URL by storing in the relationship service: the email account, the URL, an indication of a direct relationship between the email address and the URL, and an indication of an association between the photograph and the first profile.

10. The computer program product of claim 9, further comprising computer-readable program code configured to:
    upon determining that the URL does not exist in the first service:
       create an invitation resource identifier associated with the photograph;
       update the relationship to associate the invitation resource identifier with the email account; and
       send the invitation resource identifier for user acceptance.

11. The computer program product of claim 10, further comprising computer-readable program code configured to:
    upon receiving user acceptance of the invitation resource:
       create the URL; and
       substitute the URL for the invitation resource identifier.

12. The computer program product of claim 11, wherein the email address is of a user having the email account, wherein creating the relationship further comprises associating the photograph with the first profile.

* * * * *